Sept. 9, 1958 D. E. GOMMEL 2,850,923
CHAIN SAW CUTTER FILE HOLDER
Filed Oct. 16, 1953
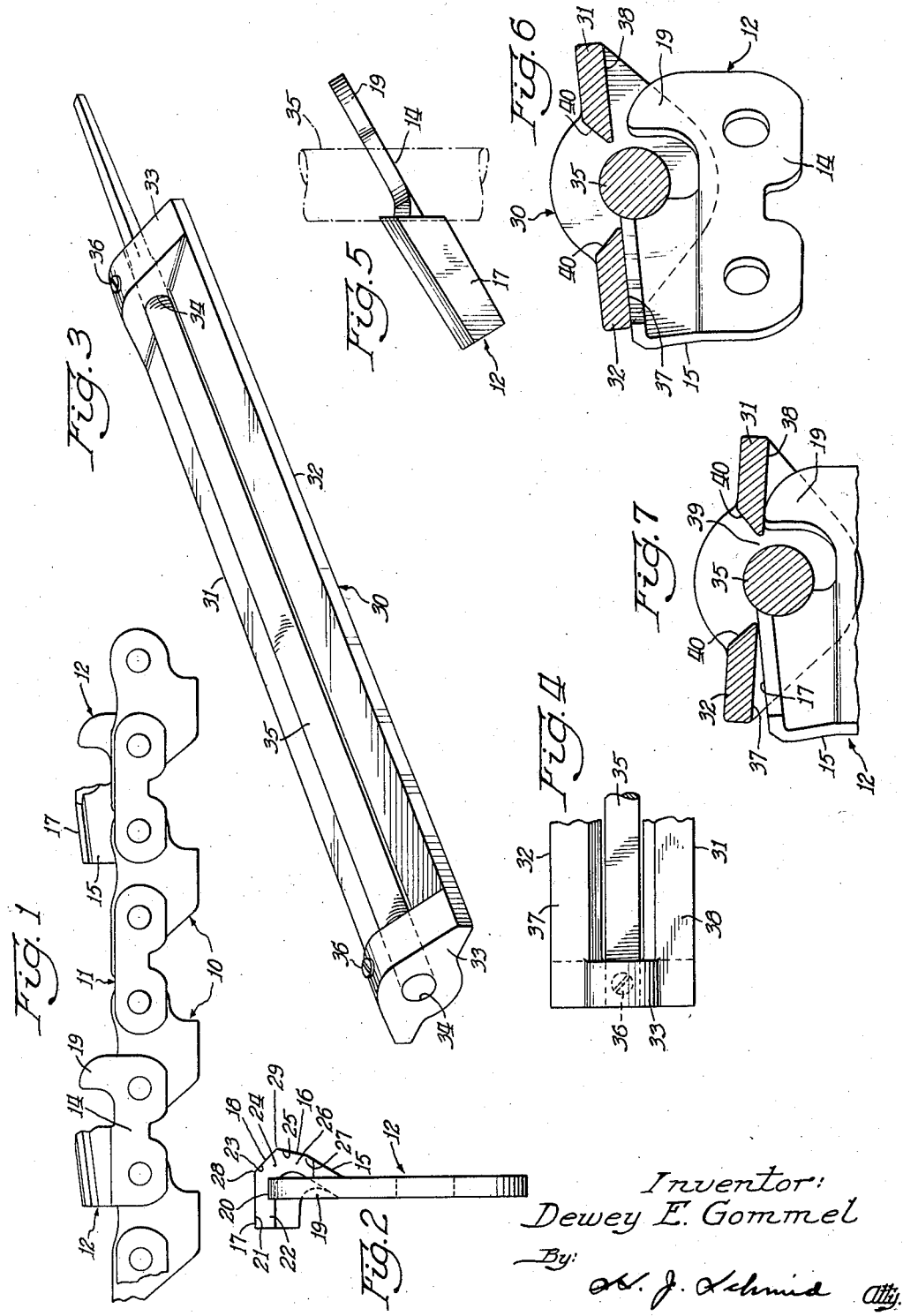
Inventor:
Dewey E. Gommel
By: W. J. Schmid Atty.

United States Patent Office 2,850,923
Patented Sept. 9, 1958

2,850,923

CHAIN SAW CUTTER FILE HOLDER

Dewey E. Gommel, Indianapolis, Ind., assignor to Borg-Warner Corporation, Chicago, Ill., a corporation of Illinois Application October 16, 1953, Serial No. 386,457

5 Claims. (Cl. 76—36)

This invention relates to saw-sharpening devices, and more particularly to saw-sharpening devices used in sharpening chain saw cutters.

An object of the invention is to provide a saw-sharpening device for sharpening chain saw cutters of the chisel type, each having cutting edges formed on a shank portion and toe portion thereof, the toe portion extending at right angles to the plane of the saw chain, and the cutter including a depth gauge to regulate the depth of cut of the tooth.

Another object of the invention is to provide a saw-sharpening device for sharpening chain saw cutters of the chisel type having means cooperating with the teeth and depth gauges of the cutters to insure the correct positioning of the saw-sharpening device with relation to the chain saw cutter to sharpen the cutters.

A further object of the invention is to provide a saw sharpening device comprising a file holder for the purpose described and comprising spaced parallel guides receiving a file therebetween and disposing the file in correct sharpening relation to the cutter by the guides engaging the toe portion and the depth gauge of the cutter, or, alternatively, only one of the guides engaging the toe portion of the cutter.

With these and other objects in view, the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings:

Fig. 1 is an illustration of a saw chain utilizing cutters of the chisel type with which my improved saw-sharpening device is adapted for use;

Fig. 2 is a front elevation of one of the cutters of the saw chain of Fig. 1;

Fig. 3 is a perspective view of a saw-sharpening device or file holder embodying the invention, the saw sharpening device being shown as inverted from its normal position of operation;

Fig. 4 is a bottom view of the left end of the saw-sharpening device shown in Fig. 3;

Fig. 5 is an enlarged view of one of the cutters shown in Figs. 1 and 2 and illustrating the relation of the file to the cutting edge of the cutter during sharpening of the cutter;

Fig. 6 is a cross-sectional view of the saw-sharpening device shown in Fig. 3 and illustrating one of the positions of the device with relation to the saw chain cutter during sharpening of the cutter;

Fig. 7 is another view of a cross-section of the saw-sharpening device shown in Fig. 3 and illustrating another position of the device for sharpening the cutter of the saw chain shown in Figs. 1 and 2.

The saw-sharpening device shown in Figs. 3, 4, 5, 6 and 7 is particularly adapted for use in filing the cutting edges of a saw chain cutter of the type having a shank portion and a toe portion provided with cutting edges, the toe portion extending in a direction at right angles to the plane of the saw chain. Fig. 1 illustrates a specific form in a chain of this type comprising a plurality of centrally-disposed sprocket-engaging links 10 pivotally joined together by means of oppositely-disposed pairs of side plates 11 and 12, one of the side plates 12 of each pair comprising cutter-carrying links which are identical, except that they are of opposite hand. Each of the cutter-carrying links comprises a plate having a substantially planar body portion 14 and a shank portion 15 offset from the plane of the body and inclined relative thereto, diverging from said plane as said shank portion retreats from that edge of the body portion from which it extends. At its distal end, the shank portion 15 is formed to provide, on its surface remote from said body plane, a flat surface 16 disposed in a plane slightly inclined, for instance, at an angle of 10° of divergence from the body plane as it retreats from the body. The plane surface 16 is also slightly inclined, for instance, at an angle of convergence of 1° 30", as said surface progresses rearwardly. The cutter further comprises a flat toe portion having an outer flat surface 17 disposed in a plane substantially perpendicular to the body plane and traversing that plane and the median plane of the chain. The outer surface of the cutter is further formed to provide one or more intermediate flat surfaces located between, and joining, the surfaces 16 and 17, adjacent ones of all of said flat surfaces meeting each other in dihedral angles, each exceeding 90°. In the illustrated cutter, only one such intermediate surface 18 is provided, the surface being located in a plane inclined at an angle of 45° to the body plane, and converging therewith as it retreats from the above-identified body edge. Each of the surfaces 16, 17 and 18 terminate at a cutting edge. A depth gauge 19 is provided which is co-planar with the body, and has its end 20 so disposed as to limit the depth of cut of the edge 21 to preferably one-half of the height of the surface 18 in a direction parallel with the body plane.

A cutter of the type described has the adjacent surfaces of the shank, toe and intermediate portions lying in the surface of a common cylinder, and the cutter may be sharpened by a round file by disposing the file with its axis parallel with the edge 21 as shown in Fig. 5 to hollow grind the leading surface 22 of the tooth toe preferably in a position to produce a slight hook in the edge 23 of the surface 24. The degree of hook formed in the edges 23 and 25 affects the angularity of the effective bevels of the surfaces 24 and 26 relative to the surface 18 and 16 respectively. As an example of the degree of hook as shown in the drawings, it produces a somewhat hollow-ground effect of the edge 23 in a relatively sharp-cutting bevel for the edge 25, and locates the corner or juncture 29 ahead of all other parts of the cutting edges whereby the edge 23 is given a shear or rake rearwardly toward the corner 28, which tends to counteract the effect of the shear of the edge 21, and it provides for smooth cutting rather than a tearing action by the edge 23. At the same time a portion of the shank 15 will be sharpened to a cutting edge as at 27. For a further description of this saw chain, reference should be made to patent application, Serial No. 304,618, filed August 15, 1952 which has issued as Patent No. 2,744,548.

Referring now to the Figs. 3, 4, 6 and 7, there is shown therein a saw-sharpening device comprising a file holder in the form of a casting or plate 30 comprising a pair of flat parallel rails or guides 31 and 32 which are secured together in spaced relation by crossheads 33 respectively bridging and connecting the opposite ends of the two bars 31 and 32 to hold them in the described aforesaid relationship and to define a slot therewith, the crossheads 33 having aligned openings 34 for receiving opposite ends of the round file 35 secured within the crossheads by screws 36 threaded into the openings in the crossheads for engagement with the opposite ends of the file as clearly shown in Figs. 3 and 4. The openings 34 in the crossheads 33—33 are so arranged that the file 35 is disposed equi-distantly from the opposite edges of the adjoining side bars 31 and 32 of the holder. It will be apparent from an inspection of Figs. 6 and 7 that the file is thus suspended between the two side rails 31 and 32 with the major portion of the file being disposed below the side rails and the coplanar flat bottom surfaces 37 and 38 of the rails so that the file cooperates with the cutter to insure that the file is at its optimum sharpening position to the cutting edges of the cutter. As shown in Figs. 6 and 7, the file holder thus permits the file top point to be one quarter (¼) the file diameter above the surface 17 of the chain saw cutter link which is the correct position to sharpen the cutters. For the purpose of insuring the file being correctly held in position between the rails 31 and 32 and in proper relation to the surfaces 37 and 38 of the rails in the event the holes 34 are larger than the file being used, it will be noted from an inspection of Fig. 3 that two screws 36 are used and the screws 36 are positioned in the crossheads 33 to force the file to the same side at both ends of the file holder, i. e. toward and into proper sharpening position between the rails and the surfaces 37 and 38 thereof.

The saw-sharpening device is particularly advantageous in providing two alternative methods of sharpening the cutting edges of the cutter link, as shown in Figs. 6 and 7. Referring to Fig. 6, the surface 37 of the file holder will rest flatly on the flat surface 17 of the chain cutter. If a cutter of opposite hand is to be sharpened, the other side 38 of the file holder will rest flatly on the similar surface of the cutter link. In either case, the file is held with its axis concentric with the axis of the common cylinder of the adjacent surfaces of the shank, toe and intermediate portion to hollow-file the cutting edges of these portions of the cutter. Referring to Fig. 7 illustrating the second method of sharpening the cutter link, the surface 17 of the cutter is engaged by the surface 37 of the rail 32 at one edge thereof adjacent the opening 39 between the two side rails 31 and 32, and the surface 38 of the rail 31 rests on the depth gauge 19. In this position the file is also held with its axis concentric with the axis of the common cylinder of the adjacent surfaces of the shank, toe and intermediate portions of the cutter to effect hollow filing of these portions of the cutter. It will be apparent from an examination of either method of filing the cutter links by the described methods shown in Figs. 6 and 7 that with the round file seated against the cutting edges of the bevels 22, 24, and 26 of the link, as shown in Fig. 2, the cutter link may be readily sharpened by either of the methods described.

A feature of the invention is the formation of the file holder in a manner to permit the sawyer to readily observe the sharpening effect of the file during its sharpening action, as the opposite side rails 31 and 32 are bevelled along their adjacent edges as at 40 to afford ease in sighting through the file holder for observing the cutting action of the file upon the cutting edges of the cutter.

The file holder of the saw sharpening device of this invention provides an easy and expedient manner of sharpening chain saw cutter links of any chisel type, such as exemplified herein or in Cox Patents Nos. 2,508,784 and 2,622,636, or Hassler Patent No. 2,326,854, by positioning the file in relation to the cutting edges of the cutter as shown in Fig. 5, and while holding the file holder in relation to the cutter, as shown in Fig. 6 or 7, reciprocating the file until the desired sharpening qualities have been afforded the cutting edges of the cutter. The positioning of the file in the file holder automatically insures that the file will be kept in its correct position to sharpen the cutting edges of the cutter links at all times by either of the alternative methods illustrated in Figs. 6 and 7.

Having illustrated and described a preferred embodiment of the invention, it should be apparent that the invention permits of modification in arrangement and detail. I claim as my invention all such modifications as come within the true spirit and scope of the appended claims.

I claim:

1. In a file holder, a pair of spaced parallel rigid elongate members having flat coplanar guide surfaces; a pair of spaced crossheads extending transversely of said members and connecting said members and defining a slot therewith in said holder extending longitudinally thereof, each of said crossheads having aligned circular openings therein for reception of a round file and disposing said file in said slot with the major portion of said file being positioned at one side of the plane of said surfaces of said members and outwardly of said members, the adjacent edges of said members, defining said slot, being bevelled in convergent relation to the plane of said surfaces.

2. A file holder for use in filing a concavely beveled cutting edge on either a right or a left hand chain saw cutter having a gullet in the central portion thereof and formed with a cutting tooth portion and a depth gauge portion at opposite ends thereof, said file holder comprising a pair of spaced parallel elongate members having flat coplanar surfaces; longitudinally spaced crossheads respectively connecting said elongate members at the ends thereof for maintaining the parallel relation between said elongate members, said elongate members thereby defining an elongate slot therebetween; each of said crossheads having aligned circular openings therein for cooperatively receiving a round file therethrough; means for securing said file in said openings; said openings being so positioned in said crossheads that the file, when disposed in said circular openings, is partially positioned in said slot with the greater portion thereof projecting beyond the plane of said coplanar surfaces; the adjacent edges of said members which define said slot being beveled in convergent relation to the plane of said coplanar surfaces; whereby said parallel elongate members are respectively adapted to engage the cutting tooth and depth gauge portions of the cutter to thereby guide the file during the filing of said concavely beveled cutting edge on the chain saw cutter, and said beveled edges of said elongate members facilitating the observation of the filing action during the filing of the cutting edge on the cutter.

3. A file holder for use in filing a concavely beveled cutting edge on a chain saw cutter having a gullet in the central portion thereof and formed with a cutting tooth portion and a depth gauge portion at opposite ends thereof, said file holder comprising a pair of spaced parallel elongate members having flat coplanar surfaces; longitudinally spaced crossheads respectively connecting said elongate members at the ends thereof for maintaining the parallel relation between said elongate members, said elongate members thereby defining an elongate slot therebetween; each of said crossheads having aligned openings therein for cooperatively receiving a round file therethrough; means for securing said file in said openings; said openings being so positioned in said crossheads that one side of the file, when the file is disposed in said circular openings, projects into said elongate slot by an amount substantially equal to one-quarter of the diameter of said file with the greater portion of the file projecting beyond the plane of said coplanar surfaces; whereby said parallel elongate members are adapted to guide the file during the filing of said concavely beveled cutting edge on the chain saw cutter.

4. A file holder for use in filing a concavely beveled cutting edge on a chain saw cutter having a gullet in the central portion thereof and formed with a cutting tooth portion and a depth gauge portion at opposite ends thereof, said file holder comprising a pair of spaced parallel elongate members having flat coplanar surfaces;

longitudinally spaced cross heads respectively connecting said elongate members at the ends thereof for maintaining the parallel relation between said elongate members, said elongate members thereby defining an elongate slot therebetween; each of said crossheads having aligned circular openings therein for cooperatively receiving a round file therethrough; means for securing said file in said openings; said openings being so positioned in said crossheads that one side of the file, when the file is disposed in said circular openings, projects into said elongate slot by an amount substantially equal to one-quarter of the diameter of said file with the greater portion of the file projecting beyond the plane of the coplanar surfaces; whereby said parallel elongate members are adapted to guide the file during the filing of said concavely beveled cutting edge on the chain saw cutter, either with one of said parallel elongate members lying flat on the cutting tooth portion of the cutter while the file is reciprocated, or alternatively, with both of said parallel elongate members respectively engaging the cutting tooth and depth gauge portions of the cutter while the file is reciprocated.

5. A file holder for use in filing a concavely beveled cutting edge on a chain saw cutter having a gullet in the central portion thereof and formed with a cutting tooth portion and a depth gauge portion at opposite ends thereof, said file holder comprising a pair of spaced parallel elongate members having flat coplanar surfaces; longitudinally spaced crossheads respectively connecting said elongate members at the ends thereof for maintaining the parallel relation between said elongate members, said elongate members thereby defining an elongate slot therebetween; each of said crossheads having aligned circular openings therein for cooperatively receiving a round file therethrough; means for securing said file in said openings; said openings being so positioned in said crossheads that one side of the file, when the file is disposed in said circular openings, projects into said elongate slot by an amount substantially equal to one-quarter of the diameter of said file with the greater portion of the file projecting beyond the plane of said coplanar surfaces; whereby said parallel elongate members are adapted to guide the file during the filing of said concavely beveled cutting edge on the chain saw cutter, and said elongate members being spaced apart by an amount greater than the diameter of said file so as to facilitate observing the filing action during the filing of the cutting edge on the cutter.

References Cited in the file of this patent

UNITED STATES PATENTS

| | | |
|---|---|---|
| 593,793 | Vreeland | Nov. 16, 1897 |
| 683,842 | Bulson | Oct. 1, 1901 |
| 751,671 | McCauley | Feb. 9, 1904 |
| 1,454,893 | Jackson | May 15, 1923 |
| 1,666,395 | Miller | Apr. 17, 1928 |
| 1,719,351 | Wood | July 2, 1929 |
| 2,601,227 | Shebel | June 24, 1952 |
| 2,664,017 | Cox | Dec. 29, 1953 |